United States Patent
Zhu (10) Patent No.: US 12,223,224 B1
(45) Date of Patent: Feb. 11, 2025

(54) DATA DISPLAY SYSTEM AND METHOD FOR NEW ENERGY DIGITAL WATER PURIFIER

(71) Applicant: Junfeng Zhu, Zhumadian Henan (CN)

(72) Inventor: Junfeng Zhu, Zhumadian Henan (CN)

( * ) Notice: Subject to any disclaimer, the term of this patent is extended or adjusted under 35 U.S.C. 154(b) by 0 days.

(21) Appl. No.: 18/427,565

(22) Filed: Jan. 30, 2024

(30) Foreign Application Priority Data

Nov. 24, 2023 (CN) .......................... 202311583667.4

(51) Int. Cl.
| | | |
|---|---|---|
| *G06F 3/14* | (2006.01) | |
| *B01D 29/60* | (2006.01) | |
| *C02F 1/00* | (2023.01) | |
| *G06F 3/147* | (2006.01) | |

(52) U.S. Cl.
CPC .......... *G06F 3/147* (2013.01); *B01D 29/603* (2013.01); *C02F 1/001* (2013.01); *C02F 1/008* (2013.01); *B01D 2201/52* (2013.01); *C02F 2209/02* (2013.01); *C02F 2209/445* (2013.01)

(58) Field of Classification Search
CPC .......... G06F 3/147; G06F 3/14; G06F 3/1475; C02F 1/001; C02F 2209/02; C02F 2209/445; C02F 1/008; C02F 2209/005; C02F 2209/006; B01D 29/603; B01D 29/608; B01D 2201/52; B01D 2201/54
USPC .................................... 210/85, 94, 96.1, 138
See application file for complete search history.

(56) References Cited

U.S. PATENT DOCUMENTS

| | | | | | |
|---|---|---|---|---|---|
| 5,089,144 | A | * | 2/1992 | Ozkahyaoglu | .......... G01P 1/103 340/12.18 |
| 5,865,991 | A | * | 2/1999 | Hsu | ........................ C02F 1/008 210/93 |
| 7,442,237 | B1 | * | 10/2008 | Gardner | ................. A62B 23/02 55/DIG. 35 |
| 10,969,262 | B1 | * | 4/2021 | Zhang | ................... G01F 23/268 |

(Continued)

FOREIGN PATENT DOCUMENTS

| | | | | | |
|---|---|---|---|---|---|
| CN | 203588615 | U | * | 5/2014 | |
| CN | 104355432 | A | * | 2/2015 | |
| CN | 110573402 | A | * | 12/2019 | ........ B60W 50/0098 |

OTHER PUBLICATIONS

English translation of Li patent publication CN-203588615-U, published May 7, 2014. (Year: 2014).*

(Continued)

*Primary Examiner* — Joseph W Drodge
(74) *Attorney, Agent, or Firm* — Hemisphere Law, PLLC; Zhigang Ma (57) ABSTRACT

A data display system and method for new energy digital water purifier is disclosed. The data display system includes a data recording module and a lifetime calculation module. Herein the data recording module is configured to detect and record an initial electric energy generated by the generator when there is a water stream flowing through the new energy digital water purifier after the new energy digital water purifier has replaced a filter element. By calculating the electric energy generated by the generator to reflect the degree of obstruction of the filter element, and by recording generation duration of the generator as the usage duration of the filter element, the user is alerted to replace the filter element in time when the degree of obstruction of the filter element is high or the usage duration is too long.

10 Claims, 6 Drawing Sheets

(56) References Cited

U.S. PATENT DOCUMENTS

2015/0361840 A1\* 12/2015 Verdegan ............. B01D 35/143
                                                                          702/34
2020/0277768 A1\* 9/2020 Chong ................... E03C 1/326

OTHER PUBLICATIONS

English translation of Gao patent publication CN-104355432-A, published Feb. 18, 2015 (Year: 2015).\*
English translation of Blythe patent publication CN-110573402-A, published Dec. 13, 2019. (Year: 2019).\*

\* cited by examiner

DATA DISPLAY SYSTEM AND METHOD FOR NEW ENERGY DIGITAL WATER PURIFIER

TECHNICAL FIELD

The present application relates to the technical field of water purification, and in particular to a data display system and method for new energy digital water purifier.

BACKGROUND

Nowadays, water sources are more polluted due to industrial and technological development, coupled with rising of health awareness of modern people to require high water quality, and a large number of water purifiers are produced on market. General the water purifiers may filter general pollutants, chlorine and impurities through different water purification methods, etc. currently water purification methods mainly include reverse osmosis (RO) treatment, activated carbon filtration, water softener water softening method, distillation method.

Necessity of green environmental protection is to ensure future survival and development of mankind. As global population grows and economy develops, consumption of energy is also increasing, and limited energy resources are facing increasing pressures. Meanwhile, impact of traditional energy utilization on the environment is becoming more and more serious, such as air pollution, greenhouse effect, water shortage and other problems. Therefore, it is urgently need to take measures to ensure sustainable use of energy while reducing impact on the environment. And now on the market even if a water purifier with data display function also needs an external power supply, which is not good enough in green environmental protection, so there is a needs for a digital display water purification faucet with its own water purification function, and can displays data, and meanwhile use water stream new energy for power supply.

However, more commercially available water purifier does not have a display function, and cannot display information such as water temperature. Therefore, there is a needs to provide a digital display water purification faucet with its own water purification function and can displays data, but in a process of using the digital display water purification faucet, a user often ignores a service life of a filter element, and not timely replacement of the filter element usually leads to reduce an effect of water purification, thereby affecting the use's health.

SUMMARY

In view of problems in existing technologies, the present disclosure aims to provide a data display system for new energy digital water purifier, which is configured with a digital display panel, and the digital display panel is configured with a generator inside.

In one aspect, in some embodiments of the present disclosure, the data display system includes a data recording module, which is configured to detect and record an initial electric energy generated by the generator when there is a water stream flowing through the new energy digital water purifier after the new energy digital water purifier has replaced a filter element; and detect a real-time electric energy generated by the generator during use of the new energy digital water purifier after the new energy digital water purifier has replaced the filter element.

In some embodiments of the present disclosure, the data display system further includes a lifetime calculation module, connected to the data recording module, which is configured to calculate and obtain a degree of obstruction of the filter element based on the real-time electric energy and the initial electric energy; and display the degree of obstruction through the digital display panel; and determine by the degree of obstruction whether the filer element reaches an end of its service life to alert a user to replace the filer element.

In some preferred embodiments of the present disclosure, the new energy digital water purifier is configured with an electric energy detection circuit inside connected to the generator. And the data recording module includes an initial detection unit and a real-time detection unit.

Herein the initial detection unit is configured to detect an electric energy generated by the generator in one unit of time as the initial electric energy by means of the electric energy detection circuit after the new energy digital water purifier has replaced the filter element and when there is first a steady water stream flowing through the new energy digital water purifier.

Herein the real-time detection unit is configured to detect the electric energy generated by the generator in one unit of time as the real-time initial electric energy by means of the electric energy detection circuit when there is the water stream flowing through the new energy digital water purifier during use of the new energy digital water purifier after replacement of the filter element.

In some preferred embodiments of the present disclosure, the lifetime calculation module includes a degree of obstruction calculation unit and a replacement prompt unit.

Herein the degree of obstruction calculation unit is configured to calculate a ratio of the real-time electric energy to the initial electric energy when detected the real-time electric energy during use of the new energy digital water purifier after replacement of the filter element, and take a difference between 1 and the ratio as the degree of obstruction.

Herein the replacement prompt unit is connected to the degree of obstruction calculation unit, configured to prompt the user that the filter element has reached the end of its service life and needs to replace the filter element when the degree of obstruction is greater than a preset threshold value of the degree of obstruction.

In some preferred embodiments of the present disclosure, the new energy digital water purifier is also configured with a temperature acquisition circuit inside, and then the data display system further includes a water temperature measurement module.

Herein the water temperature measurement module is configured to collect a real-time water temperature of a water stream flowing through the new energy digital display water purifier by means of the temperature acquisition circuit, and display the real-time water temperature through the digital display panel after difference smoothing.

In some preferred embodiments of the present disclosure, the new energy digital water purifier is also configured with a timing circuit inside that connected to the generator, and then the data recording module further includes a duration recording unit.

Herein the duration recording unit is configured to record a sum of hours of the electric energy generated by the generator beginning from the new energy digital water purifier has replaced the filter element, take the sum as an usage duration and display it on the digital display panel, and then reset the usage duration in next replacement of the filter element.

In some preferred embodiments of the present disclosure, the lifetime calculation module also includes a duration prompt unit. Herein the duration prompt unit is configured to alert the user that the filter element has reached the end of its service life and needs to replace the filter element when the usage duration is greater than a preset usage duration threshold of the filter element.

In another aspect, in some embodiments of the present disclosure, a data display method for new energy digital water purifier is provided, which applied to the data display system described above, and the data display method includes following S1 and S2.

S1, the data display system detects the initial electric energy generated by the generator after the new energy digital water purifier has replaced the filter element and when there is a water stream flowing through the new energy digital water purifier, and detects the real-time electric energy generated by the generator during use of the new energy digital water purifier after replacement of the filter element.

S2, the data display system calculates the degree of obstruction of the filter element based on the real-time electric energy and the initial electric energy, displays the degree of obstruction via the digital display panel, and determines whether the filter element has reached its service life based on the degree of obstruction. If YES, the user is alerted to replace the filter element. If NO, return to S2.

In some preferred embodiments of the present disclosure, the S1 includes following S11 and S12.

S11, the data display system detects the electric energy generated by the generator in one unit of time as the initial electric energy through an electric energy detection circuit after the new energy digital display water purifier has replaced the filter element and when there is first a steady water stream flowing through the new energy digital display water purifier.

S12, the data display system detects the electric energy generated by the generator in one unit of time as the real-time initial electric energy by means of the electric energy detection circuit when there is the water stream flowing through the new energy digital display water purifier during use of the new energy digital display water purifier after replacement of the filter element.

In some preferred embodiments of the present disclosure, the S2 includes following S21 and S22.

S21, the data display system calculates a ratio of the real-time electric energy to the initial electric energy when the real-time electric energy is detected during use of the new energy digital display water purifier after replacement of the filter element, and takes a difference between 1 and the ratio as the degree of obstruction.

S22, the data display system determines whether the degree of obstruction is greater than a preset degree of obstruction threshold. If YES, the user is alerted to replace the filter element. If NO, return to S21.

In some preferred embodiments of the present disclosure, the new energy digital display water purifier is also configured with a temperature acquisition circuit inside, and the data display method further includes following SA1.

SA1, the data display system collects the real-time water temperature of the water stream flowing through the new energy digital display water purifier through the temperature acquisition circuit and displays the real-time water temperature through the digital display panel after differential smoothing.

The above technical solutions of the present disclosure have at least following advantages or beneficial effects. By calculating the electric energy generated by the generator during the first use and use after replacing the filter element, reflecting changes of the water stream rate, and then reflecting the degree of obstruction of the filter element. Further, by recording generation duration of the generator as the usage duration of the filter element, the user is alerted to replace the filter element in time when the degree of obstruction of the filter element is high or the usage duration is too long.

DETAILED DESCRIPTION OF THE EMBODIMENTS

The technical solutions of present disclosure will be described in detail below in conjunction with accompanying drawings and specific embodiments. The present invention is not limited to such embodiments, and other embodiments may fall within the scope of the present invention as long as they are consistent with conception of the present invention.

In some preferred embodiments of the present disclosure, based on problems discussed above, a data display system for new energy digital water purifier is provided, which is configured with a digital display panel, and the digital display panel is configured with a generator inside.

Figure 1:
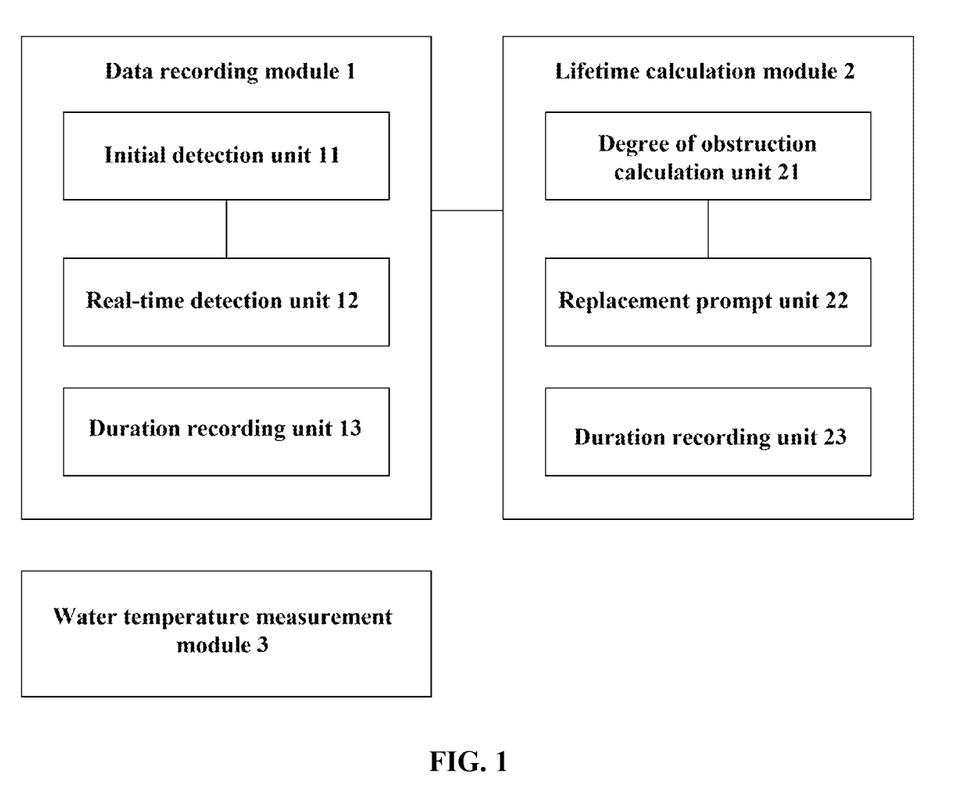
FIG. 1 is a structural schematic diagram of a data display system for new energy digital water purifier in accordance with some preferred embodiments of the present disclosure.

In some embodiments of the present disclosure, the data display system includes a data recording module 1, which is configured to detect and record an initial electric energy generated by the generator when there is a water stream flowing through the new energy digital water purifier after the new energy digital water purifier has replaced a filter element; and detect a real-time electric energy generated by the generator during use of the new energy digital water purifier after the new energy digital water purifier has replaced the filter element.

In some embodiments of the present disclosure, the data display system further includes a lifetime calculation module 2, connected to the data recording module, which is configured to calculate and obtain a degree of obstruction of the filter element based on the real-time electric energy and the initial electric energy; and display the degree of obstruction through the digital display panel; and determine by the degree of obstruction whether the filer element reaches an end of its service life to alert a user to replace the filer element.

Specifically, due to many commercially available water purifiers only have function of water purification without function of digital display, resulting in a user not being able to accurately know a current use of the filter element used in the water purifier. And some of existing water purifiers, even if they have the function of digital display, but also can only display some data such as a current room temperature, a current temperature of water, a current flow rate of the water stream, etc., and cannot reflect the use of the filter element, resulting in the user is not able to clearly know when to replace the filter element, often using some of filter element beyond its service life, in this way, which not only no water purification effect but also because of a long-term non-replacement of the filter element breeding bacteria, thereby affecting water quality of the user.

Therefore, in some embodiments of the present disclosure, a data display system for new energy digital water purifier is provided. The system can be used with an electric energy detection circuit installed in the new energy digital water purifier, and the power used in the data display system is generated by the generator in the new energy digital water purifier, which is green and environmentally protection.

Herein, the data display system detects the initial electric energy generated by the generator after replacement of the filter element of the new energy digital water purifier and when there is the water stream flowing through the new energy digital water purifier, and detects the real-time electric energy generated by the generator during use of the new energy digital water purifier after replacement of the filter element. By calculating the electric energy generated by the generator during the first use and use after replacement of the filter element, which can reflect changes of a water stream rate and then reflect the degree of obstruction of the filter element, so as to alert the user a current service life of the filter element and alert the user to replace the filter element in time when the filter element has reached its service lift based on a determination of the degree of obstruction.

In some preferred embodiments of the present disclosure, the new energy digital water purifier is configured with an electric energy detection circuit inside connected to the generator. Referring to FIG. 1, the data recording module includes an initial detection unit 11 and a real-time detection unit 12.

Herein the initial detection unit 11 is configured to detect an electric energy generated by the generator in one unit of time as the initial electric energy by means of the electric energy detection circuit after the new energy digital water purifier has replaced the filter element and when there is first a steady water stream flowing through the new energy digital water purifier.

Herein the real-time detection unit 12 is configured to detect the electric energy generated by the generator in one unit of time as the real-time initial electric energy by means of the electric energy detection circuit when there is the water stream flowing through the new energy digital water purifier during use of the new energy digital water purifier after replacement of the filter element.

Figure 2:
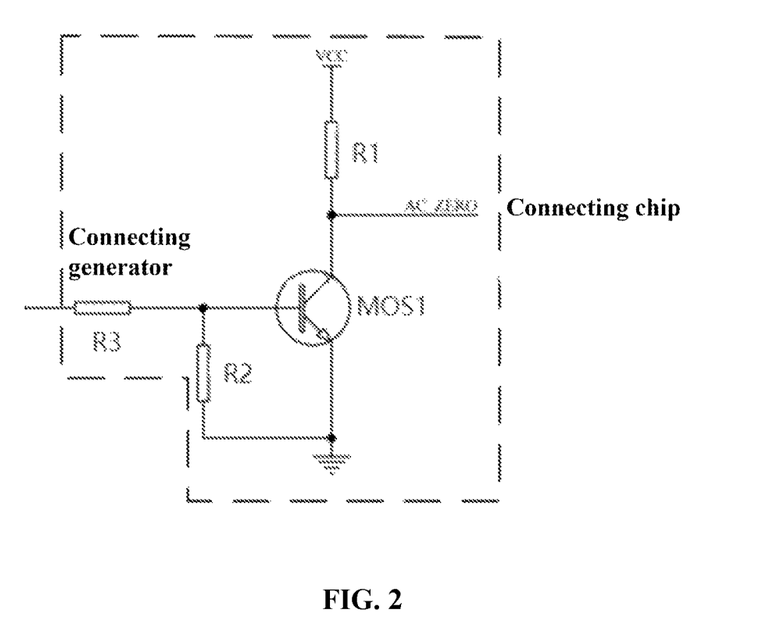
FIG. 2 is a structural schematic diagram of an electric energy detection circuit in accordance with some preferred embodiments of the present disclosure.

Specifically, in some embodiments of the present disclosure, the electric energy detection circuit is provided. Referring to FIG. 2, the electric energy detection circuit includes a first resistor R1 and a first field effect tube MOS 1.

Herein one end of the first resistor R1 is connected to a chip and the other end of the first resistor R1 is connected to the power supply end of the generator.

Herein a collector of the first field effect tube MOS 1 is connected to the other end of the first resistor R1, an emitter of the first effect tube MOS 1 is connected to one end of the second resistor R2 and grounded, a base of the first field effect tube MOS 1 is connected to the other end of the second resistor R2 and to one end of the third resistor R3, and the other end of the third resistor R2 is connected to a detection end of the generator.

In some preferred embodiments of the present disclosure, as shown in FIG. 1, the lifetime calculation module 2 includes a degree of obstruction calculation unit 21 and a replacement prompt unit 22.

Herein, the degree of obstruction calculation unit 21 is configured to calculate a ratio of the real-time electric energy to the initial electric energy when detected the real-time electric energy during use of the new energy digital water purifier after replacement of the filter element, and take a difference between 1 and the ratio as the degree of obstruction.

Herein, the replacement prompt unit 22 is connected to the degree of obstruction calculation unit 21, and is configured to prompt the user that the filter element has reached the end of its service life and needs to replace the filter element when the degree of obstruction is greater than a preset threshold value of the degree of obstruction.

Specifically, in some embodiments of the present disclosure, according to current technologies in electricity, the electric energy can be calculated according to following formula:

$$W=UIt.$$

Herein, when there is a stable water stream flowing through the water purifier, the generator inside driven by the water stream will convert water energy into electricity, at this time the electric energy detection circuit detects a voltage and a current of the generator to obtain a power of the generator. And with a preset length of time (for example, set to 1s, 2s, etc.) as one unit of time to calculate the power generated in the one unit of time.

When the filter element is used for the first time after replacement of the filter element, the electric energy generated by the generator in one unit of time is calculated as the initial electric energy, and during subsequent use, the electric energy generated by the generator in one unit of time is calculated as the real-time electric energy. In the process of using the filter element will be blocked, the real-time electric energy generated will be lower than the initial electric energy, thus the ratio of the real-time electric energy to the initial electric energy can reflect the current degree of obstruction, and the difference between 1 and the ratio is taken as the degree of obstruction. Since the water stream rate cannot be guaranteed to be the same every time, the degree of obstruction is expressed as decimal integers by a decile attenuation method, and the user is alerted to replace the filter element when the real-time electric energy finally generated is less than 10% of the initial electric energy (which means that the degree of obstruction is 90%).

Herein the decile attenuation method is a method used for parameter tuning of the controller, and its basic idea is to determine the proportionality and attenuation period of the controller by making the system produce attenuation oscillation, and then calculate the parameter values of the controller according to corresponding formula.

The decile attenuation method includes following specific steps of,

In a closed-loop control system, the controller is first turned into purely proportional and the proportionality is preset to a large value.

After reaching stability, a method of changing given values is used to add step interference, controlled variables are observed to record an attenuation ratio of curve, and then the ratio is changed from large to small, until there is a 10:1 attenuation ratio and a ratio ∂s at this time is recorded (called 10:1 attenuation ratio), then an attenuation period Ts is obtained from the curve.

Then a parameter tuning value of the controller is calculated according to the above formula.

In some preferred embodiments of the present disclosure, the new energy digital water purifier is also configured with a temperature acquisition circuit inside. As showed in FIG. 1, the data display system further includes a water temperature measurement module 3, which is configured to collect a real-time water temperature of a water stream flowing through the new energy digital display water purifier by means of the temperature acquisition circuit, and display the real-time water temperature through the digital display panel after difference smoothing.

Figure 3:
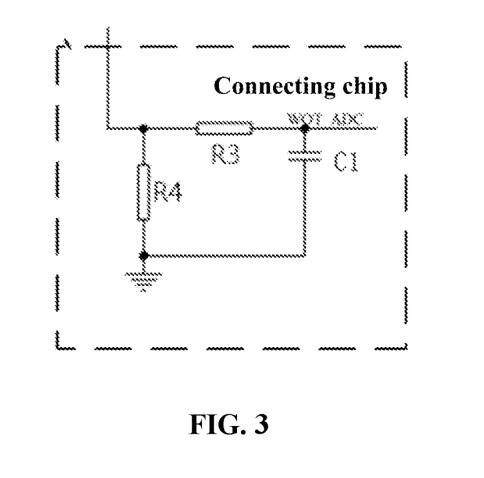
FIG. 3 is a structural schematic diagram of a temperature acquisition circuit in accordance with some preferred embodiments of the present disclosure.
Figure 4:
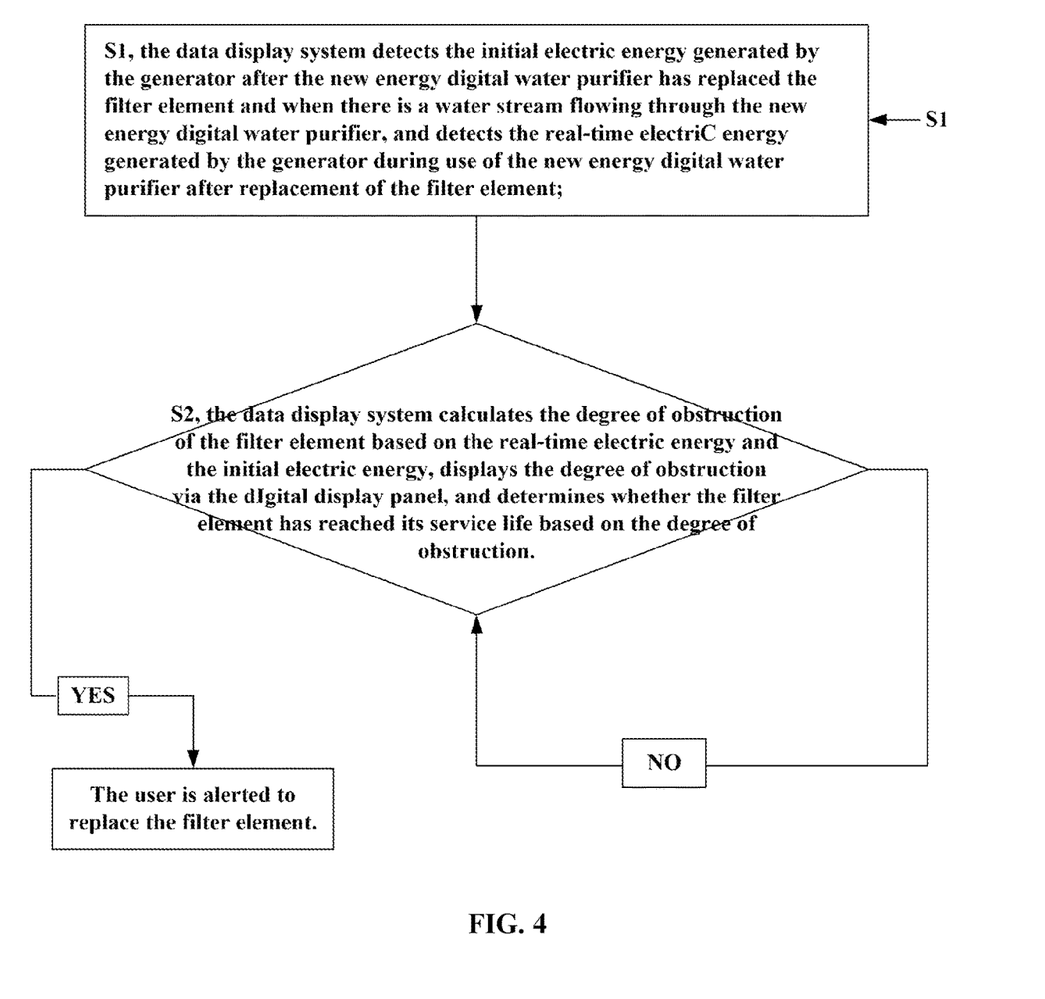
FIG. 4 is a flow diagram of a data display method for new energy digital water purifier in accordance with some preferred embodiments of the present disclosure.

Referring to FIG. 3, the temperature acquisition circuit includes a first capacitor C1, one end of the first capacitor C1 is connected to the chip and the one end of the third resistor R3, and the other end of the first capacitor C1 is connected to the other end of the third resistor R3 and grounded, the other end of a fourth resistor R4 is connected to the other end of the resistor R3.

Specifically, in some embodiments of the present disclosure, the data display system also equipped with a temperature acquisition circuit to detect a water temperature of the water stream flowing through the new energy digital water purifier.

In addition, in some embodiments of the present disclosure, although there is no mention of detecting a flow rate of the water stream, a water pressure and other parameters, in practice, the data display system of the present disclosure can be combined with hardware set up in the new energy digital water purifier, such as displaying parameters obtained from various detection circuits and various sensors on the digital display panel to reflect other parameters about the water stream for the user to review.

In some preferred embodiments of the present disclosure, the new energy digital water purifier is also configured with a timing circuit inside that connected to the generator. As shown in FIG. 1, the data recording module further includes a duration recording unit 13.

Herein the duration recording unit 13 is configured to record a sum of hours of the electric energy generated by the generator beginning from the new energy digital water purifier has replaced the filter element, take the sum as an usage duration and display it on the digital display panel, and then reset the usage duration in next replacement of the filter element.

In some preferred embodiments of the present disclosure, as shown in FIG. 1, the lifetime calculation module 2 further includes a duration prompt unit 23.

Herein the duration prompt unit 23 the duration prompt unit is configured to alert the user that the filter element has reached the end of its service life and needs to replace the filter element when the usage duration is greater than a preset usage duration threshold of the filter element.

Specifically, in some embodiments of the present disclosure, the service life of the filter element can be reflected by the degree of obstruction, but also based on the usage duration of the filter element to determiner. For example, according to a fuzzy algorithm principle that an average family uses 2 hours one day and 3 months total 180 hours, the service life of the filter element is calculated. When the usage duration reaches 180 hours, the service life of the filter element ends, need to replace the filter element, so when the generator is detected to generate power, it means that there is the water stream flowing through the filter element, the generator hours will be recorded, thus it can get how long the filter element has been used from the time of replacement to a current moment. When the usage duration reaches 180 hours and the service life of the filter element ends, it alerts the user need to replace the filter element. Either the degree of obstruction or the usage duration meets any one of such criteria and it indicates the filter element need to be replaced.

In some embodiments of the present disclosure, a data display method for new energy digital water purifier is provided, applicable to the data display system described above, and the data display method includes following S1 and S2.

S1, the data display system detects the initial electric energy generated by the generator after the new energy digital water purifier has replaced the filter element and when there is a water stream flowing through the new energy digital water purifier, and detects the real-time electric energy generated by the generator during use of the new energy digital water purifier after replacement of the filter element.

S2, the data display system calculates the degree of obstruction of the filter element based on the real-time electric energy and the initial electric energy, displays the degree of obstruction via the digital display panel, and determines whether the filter element has reached its service life based on the degree of obstruction.

If YES, the user is alerted to replace the filter element.

If NO, return to S2.

Figure 5:
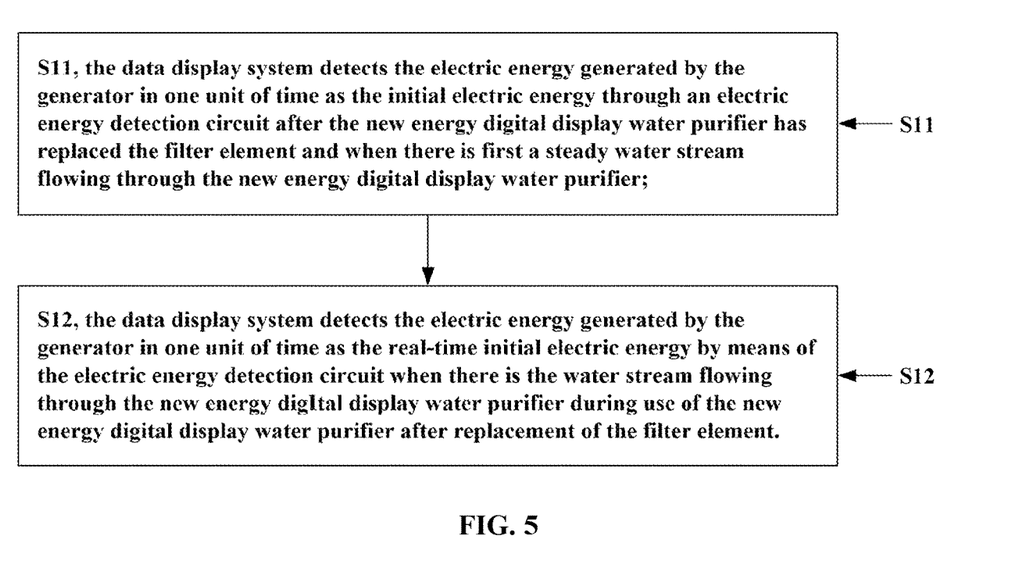
FIG. 5 is a sub-flow diagram of S1 in accordance with some preferred embodiments of the present disclosure.

In some preferred embodiments of the present disclosure, as shown in FIG. 5, the S1 includes following S11 and S12.

S11, the data display system detects the electric energy generated by the generator in one unit of time as the initial electric energy through the electric energy detection circuit after the new energy digital display water purifier has replaced the filter element and when there is first a steady water stream flowing through the new energy digital display water purifier.

S12, the data display system detects the electric energy generated by the generator in one unit of time as the real-time initial electric energy by means of the electric energy detection circuit when there is the water stream flowing through the new energy digital display water purifier during use of the new energy digital display water purifier after replacement of the filter element.

Figure 6:
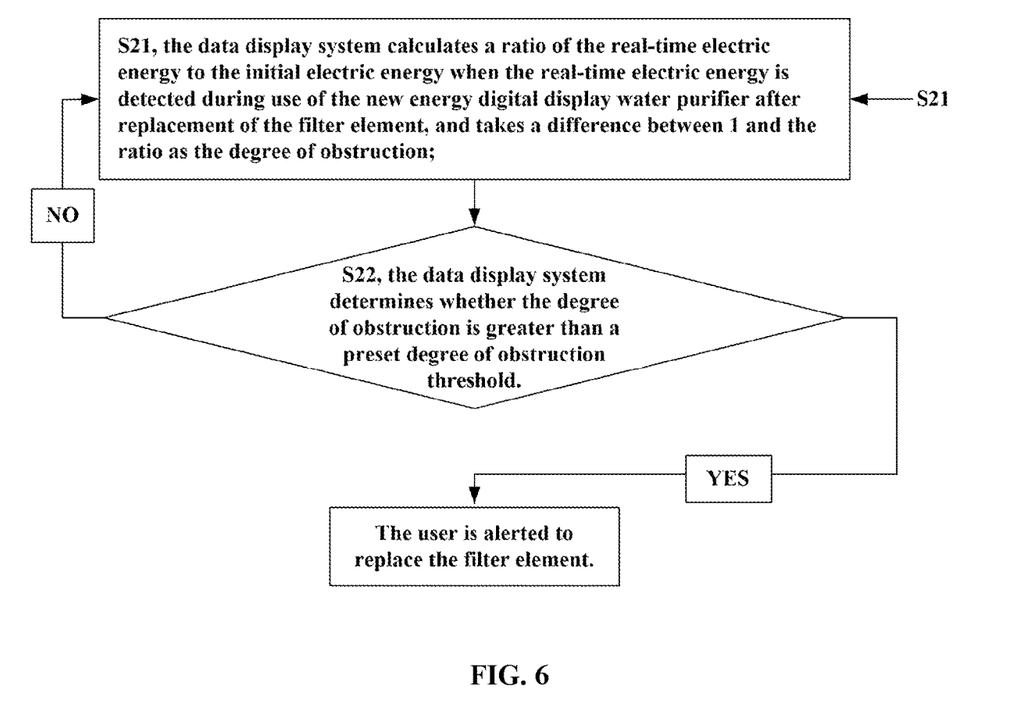
FIG. 6 is a sub-flow diagram of S2 in accordance with some preferred embodiments of the present disclosure.

In some preferred embodiments of the present disclosure, as shown in FIG. 6, the S2 includes following S21 and S22.

S21, the data display system calculates a ratio of the real-time electric energy to the initial electric energy when the real-time electric energy is detected during use of the new energy digital display water purifier after replacement of the filter element, and takes a difference between 1 and the ratio as the degree of obstruction.

S22, the data display system determines whether the degree of obstruction is greater than a preset degree of obstruction threshold. If YES, the user is alerted to replace the filter element. If NO, return to S21.

In some preferred embodiments of the present disclosure, the new energy digital display water purifier is also configured with a temperature acquisition circuit inside, and the data display method further includes following SA1.

SA1, the data display system collects the real-time water temperature of the water stream flowing through the new energy digital display water purifier through the temperature acquisition circuit and displays the real-time water temperature through the digital display panel after differential smoothing.

The above foregoing is only some preferred embodiments of the present disclosure, and is not intended to limit the embodiments and the scope of protection of the present invention. For those skilled in the art, should be able to realize that all solutions obtained by applying equivalent substitutions and obvious changes made in this specification and accompanying drawings should be included in the scope of protection of the present invention.

What is claimed is:

1. A data display system for a new energy digital water purifier, configured with a digital display panel, and wherein the digital display panel is configured with a generator inside; and wherein the data display system comprises,
    a data recording module, configured to:
    detect and record an initial electric energy generated by the generator when there is a water stream flowing through the new energy digital water purifier after the new energy digital water purifier has been provided with a replacement filter element; and
    detect a real-time electric energy generated by the generator during use of the new energy digital water purifier after the new energy digital water purifier has been provided with a replacement filter element;
    a lifetime calculation module, connected to the data recording module, and configured to,
    calculate and obtain a degree of obstruction of the filter element based on the real-time electric energy and the initial electric energy; and
    display the degree of obstruction of the filter element through the digital display panel; and
    perform a determination that such end of service life of the filter element has been reached based on the degree of obstruction of the filter element to alert a user to replace the filter element.

2. The data display system for the new energy digital water purifier according to claim 1, wherein the new energy digital water purifier is configured with an electric energy detection circuit inside connected to the generator, and the data recording module comprises,
    an initial detection unit, configured to detect an electric energy generated by the generator in one unit of time as the initial electric energy by means of the electric energy detection circuit after the new energy digital water purifier has replaced the filter element has been provided with a replacement filter element and when there is first a steady water stream flowing through the new energy digital water purifier; and
    a real-time detection unit, configured to detect the electric energy generated by the generator in one unit of time as the real-time initial electric energy by means of the electric energy detection circuit when there is the water stream flowing through the new energy digital water purifier during use of the new energy digital water purifier after replacement of the filter element.

3. The data display system for the new energy digital water purifier according to claim 1, wherein the lifetime calculation module comprises,
    a degree of obstruction calculation unit, configured to calculate a ratio of the real-time electric energy to the initial electric energy when detecting the real-time electric energy during use of the new energy digital water purifier after replacement of the filter element, and take a difference between 1 and the ratio as the degree of obstruction of the filter element; and
    a replacement prompt unit, connected to the degree of obstruction calculation unit, configured to prompt the user that the filter element has reached the end of its service life and of a need to replace the filter element when the degree of obstruction of the filter element is greater than a preset degree of obstruction threshold.

4. The data display system for the new energy digital water purifier according to claim 1, wherein the new energy digital water purifier is also configured with a temperature acquisition circuit inside, and the data display system further comprises,
    a water temperature measurement module, configured to collect a real-time water temperature of the water stream flowing through the new energy digital display water purifier by means of the temperature acquisition circuit, and display the real-time water temperature through the digital display panel after data smoothing.

5. The data display system for the new energy digital water purifier according to claim 1, wherein the new energy digital water purifier is also configured with a timing circuit inside that is connected to the generator, and the data recording module further comprises,
    a duration recording unit, configured to record a sum of hours of the electric energy generated by the generator beginning from the new energy digital water purifier being provided with a replacement filter element, take the sum as a usage duration and display it on the digital display panel, and then reset the usage duration after another replacement of the filter element.

6. The data display system for the new energy digital water purifier according to claim 5, wherein the lifetime calculation module also comprises a duration prompt unit; and
    the duration prompt unit is configured to alert the user that the filter element has reached the end of its service life and there is a need to replace the filter element when the usage duration is greater than a preset usage duration threshold of the filter element.

7. A data display method for the data system of the new energy digital water purifier, according to claim 1, and the data display method comprising steps of,
    S1, detecting the initial electric energy generated by the generator after the new energy digital water purifier has been provided with a replacement filter element and when there is a water stream flowing through the new energy digital water purifier, and detecting the real-time electric energy generated by the generator during use of the new energy digital water purifier after replacement of the filter element;
    S2, calculating the degree of obstruction of the filter element based on the real-time electric energy and the initial electric energy, displaying the degree of obstruction of the filter element via the digital display panel, and determining whether the filter element has reached its service life based on the degree of obstruction of the filter element;
    If the filter element has reached its service life, alerting the user to replace the filter element; and
    If the filter element has not reached its service life, returning to $2.

8. The data display method according to claim 7, wherein the S1 comprises steps of,
    S11, detecting the electric energy generated by the generator in one unit of time as the initial electric energy through an electric energy detection circuit after the new energy digital display water purifier has been provided with a replacement filter element and when there is first a steady water stream flowing through the new energy digital display water purifier; and S12, detecting the electric energy generated by the generator in one unit of time as the real-time initial electric energy by means of the electric energy detection circuit when there is the water stream flowing through the new energy digital display water purifier during use of the new energy digital display water purifier after replacement of the filter element.

9. The data display method according to claim 7, wherein the S2 comprises steps of, S21, calculating a ratio of the real-time electric energy to the initial electric energy when the real-time electric energy is detected during use of the new energy digital display water purifier after replacement of the filter element, and takes a difference between 1 and the ratio as the degree of obstruction of the filter element; and S22, determining whether the degree of obstruction of the filter element is greater than a preset degree of obstruction threshold;

If the degree of obstruction of the filter element is greater than the preset degree of obstruction of the filter element is greater than the preset degree of obstruction threshold, the user is alerted to replace the filter element; and If the degree of obstruction of the filter element is not greater than the preset degree of obstruction threshold, returning to S21.

10. The data display method according to claim 7, wherein the new energy digital display water purifier is also configured with a temperature acquisition circuit inside, and the data display method further comprises steps of, SA1, collecting the real-time water temperature of the water stream flowing through the new energy digital display water purifier through the temperature acquisition circuit and displaying the real-time water temperature through the digital display panel after differential smoothing.

* * * * *